(12) United States Patent
Salchow et al.

(10) Patent No.: US 11,586,470 B2
(45) Date of Patent: Feb. 21, 2023

(54) SCALABLE WORKFLOW ENGINE WITH A STATELESS ORCHESTRATOR

(71) Applicant: International Business Machines Corporation, Armonk, NY (US)

(72) Inventors: Benjamin Ralf Salchow, Albershausen (DE); Markus Reichart, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 16/533,956

(22) Filed: Aug. 7, 2019

(65) Prior Publication Data

US 2021/0042161 A1    Feb. 11, 2021

(51) Int. Cl.
*G06F 9/50* (2006.01)
*H04L 67/10* (2022.01)

(52) U.S. Cl.
CPC ............ *G06F 9/5027* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,754,857 A | 5/1998 | Gadol | |
| 5,960,404 A | 9/1999 | Chaar et al. | |
| 9,106,642 B1 * | 8/2015 | Bhimanaik | ......... H04L 63/0807 |
| 9,906,370 B2 * | 2/2018 | Apte | .................... H04L 67/1097 |
| 10,270,759 B1 * | 4/2019 | Bordelon | ................. G06F 21/33 |
| 10,437,577 B2 * | 10/2019 | Balar | .................... H04L 67/563 |
| 10,594,684 B2 * | 3/2020 | Bansal | .................... G06F 9/5027 |
| 10,819,829 B2 * | 10/2020 | Khemani | ............ H04L 63/0807 |
| 11,044,257 B1 * | 6/2021 | Heuts | .................... H04L 63/108 |
| 11,463,258 B2 * | 10/2022 | Bahety | .................. H04L 9/3213 |
| 2009/0037725 A1 * | 2/2009 | Farrugia | ............. H04L 63/0823 713/155 |
| 2009/0249287 A1 | 10/2009 | Patrick | |
| 2010/0332262 A1 * | 12/2010 | Horvitz | .................. G06Q 30/06 705/4 |

(Continued)

OTHER PUBLICATIONS

"Conductor," Netflix/OSS, Conductor is a Workflow Orchestration engine that runs in the cloud. Printed Apr. 9, 2018, 5 pages, https://netflix.github.io/conductor/intro/.

(Continued)

*Primary Examiner* — Hiren P Patel
(74) *Attorney, Agent, or Firm* — Rachel M. Yadlosky

(57) ABSTRACT

A method, system, and computer program product for running workflows and events using a stateless orchestrator includes: receiving first task data for a first task, where the first task data is information necessary for execution of the first task. The method may also include transmitting a request for a worker node to a provider, where the provider creates the worker node. The method may also include receiving a request from the worker node for the first task data. The method may also include transmitting the first task data to the worker node, where the worker node executes the first task. The method may also include, receiving results of the execution of the first task from the worker node. The method may also include, in response to the receiving the results, transmitting the results to a database.

20 Claims, 6 Drawing Sheets

(56) References Cited

U.S. PATENT DOCUMENTS

| | | | |
|---|---|---|---|
| 2011/0030047 A1* | 2/2011 | Gao | H04W 12/068 726/28 |
| 2011/0041167 A1* | 2/2011 | Nguyen | H04L 63/062 726/6 |
| 2012/0089833 A1* | 4/2012 | Jirka | H04L 9/3228 713/168 |
| 2012/0159523 A1* | 6/2012 | Kulkarni | G06F 9/5061 719/328 |
| 2014/0331309 A1* | 11/2014 | Spiers | H04L 63/0281 726/12 |
| 2015/0120928 A1* | 4/2015 | Gummaraju | H04L 67/1008 709/226 |
| 2015/0180868 A1* | 6/2015 | Sng | G06F 21/335 726/9 |
| 2016/0092283 A1 | 3/2016 | Maes et al. | |
| 2016/0150053 A1* | 5/2016 | Janczuk | H04L 67/2804 709/217 |
| 2016/0179767 A1* | 6/2016 | Mavinakuli | G06F 9/451 715/760 |
| 2016/0292011 A1* | 10/2016 | Colson | G06Q 10/06311 |
| 2017/0196031 A1* | 7/2017 | Elad | H04L 63/0807 |
| 2017/0255886 A1* | 9/2017 | Schmidt | G06Q 10/0633 |
| 2018/0083835 A1 | 3/2018 | Cole et al. | |
| 2018/0232259 A1* | 8/2018 | Chowdhury | G06F 9/52 |
| 2018/0285146 A1 | 10/2018 | Valecha | |
| 2018/0293060 A1 | 10/2018 | Behl et al. | |
| 2018/0336612 A1* | 11/2018 | Bullard, III | H04L 9/3234 |
| 2018/0352440 A1* | 12/2018 | Ballard | H04W 12/084 |
| 2018/0367363 A1 | 12/2018 | Jaeger | |
| 2019/0197251 A1* | 6/2019 | Balijepalli | H04L 63/0807 |
| 2019/0235861 A1* | 8/2019 | Suarez | G06F 8/71 |
| 2019/0384632 A1* | 12/2019 | Parikh | G06F 9/4806 |
| 2019/0394040 A1* | 12/2019 | Modi | H04L 9/0861 |
| 2020/0012545 A1* | 1/2020 | Zhang | G06F 9/542 |
| 2020/0021615 A1* | 1/2020 | Wainner | H04L 9/0861 |
| 2020/0162583 A1* | 5/2020 | Burckhardt | H04L 63/08 |

OTHER PUBLICATIONS

"Cloud Functions Overview," Cloud.Google.Com, Last updated Feb. 18, 2019, Printed Mar. 19, 2019, 2 pages, https://cloud.google.com/endpoints/docs/openapi/architecture-overview.

"Lightweight transactions," Datastax, Apache Cassandra 2.1 for DSE, © 2019 DataStax, Inc. All rights reserved. Updated: Oct. 17, 2018, 2 pages, https://docs.datastax.com/en/archived/cassandra/2.1/cassandra/dml/dml_ltwt_transaction_c.html.

"Security Partner Ecosystem," Google Cloud, Printed Apr. 9, 2019, 14 pages, https://cloud.google.com/security/partners/.

Cockcroft et al., "Benchmarking Cassandra Scalability on AWS—Over a million writes per second," The Netflix Tech Blog, Nov. 1, 2011, 15 pages, https://medium.com/netflix-techblog/benchmarking-cassandra-scalability-on-aws-over-a-million-writes-per-second-39f45f066c9e.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

SCALABLE WORKFLOW ENGINE WITH A STATELESS ORCHESTRATOR

BACKGROUND

The present disclosure relates to workflow engines, and more specifically to running workflows and events using a stateless orchestrator.

SUMMARY

The present invention provides a computer-implemented method, system, and computer program product for running workflows and events using a stateless orchestrator. The method may include receiving task data for a first task, where the task data is information necessary for execution of a task. The method may also include transmitting a request for a worker node to a provider, where the provider creates the worker node. The method may also include receiving a request from the worker node for the task data. The method may also include transmitting the task data to the worker node, where the worker node executes the first task. The method may also include receiving results of the execution of the first task from the worker node. The method may also include, in response to the receiving the results, transmitting the results to a database.

The system may have one or more computer processors and may be configured to receive task data for a first task, where the task data is information necessary for execution of a task. The system may also be configured to transmit a request for a worker node to a provider, where the provider creates the worker node. The system may also be configured to receive a request from the worker node for the task data. The system may also be configured to transmit the task data to the worker node, where the worker node executes the first task. The system may also be configured to receive results of the execution of the first task from the worker node. The system may also be configured to, in response to receiving the results, transmit the results to a database.

The computer program product may include a computer readable storage medium having program instructions embodied therewith, the program instructions executable by a server to cause the server to perform a method. The method may include receiving task data for a first task, where the task data is information necessary for execution of a task. The method may also include transmitting a request for a worker node to a provider, where the provider creates the worker node. The method may also include receiving a request from the worker node for the task data. The method may also include transmitting the task data to the worker node, where the worker node executes the first task. The method may also include receiving results of the execution of the first task from the worker node. The method may also include, in response to the receiving the results, transmitting the results to a database.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
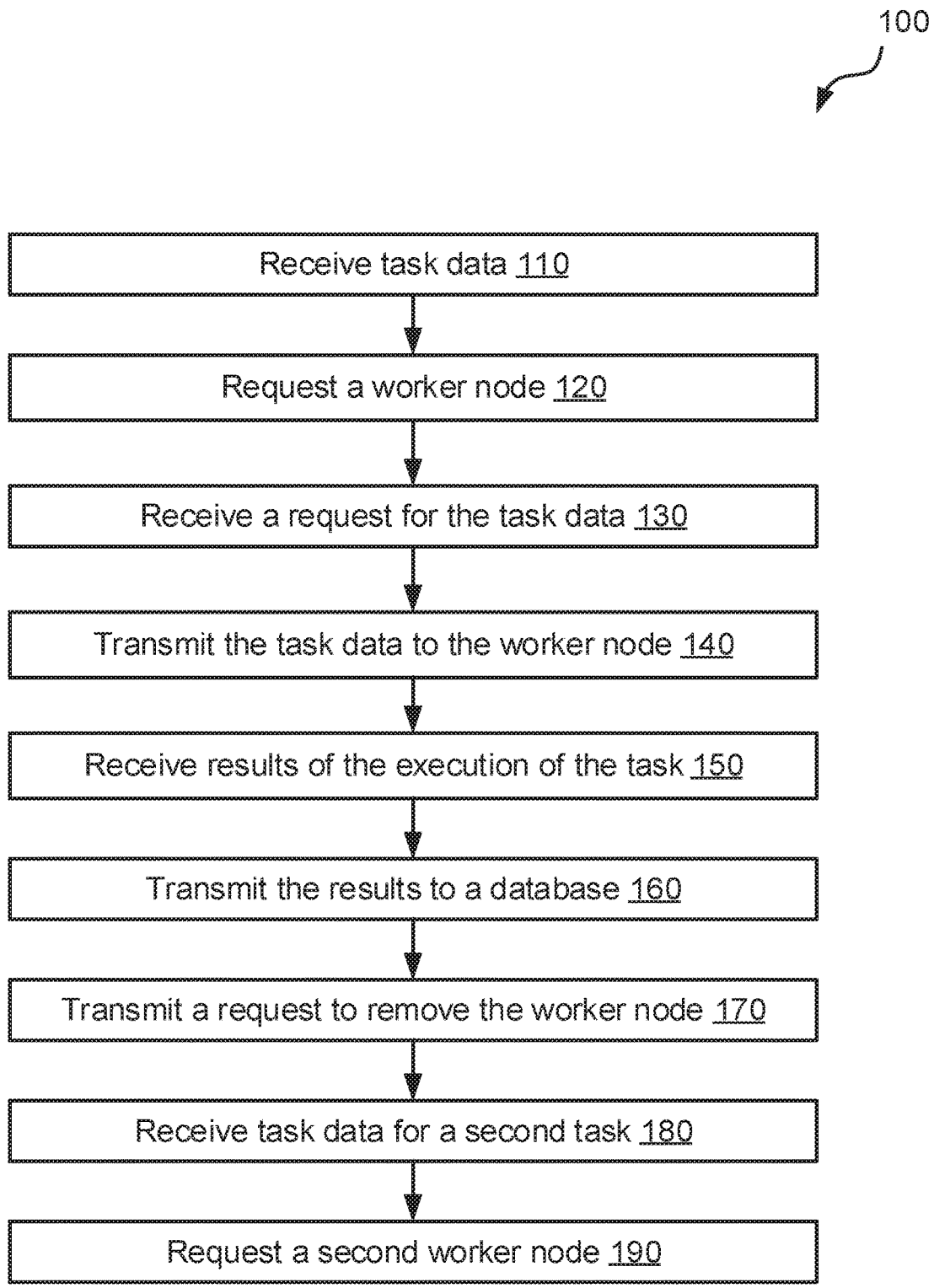
FIG. 1 depicts a flowchart of a set of operations for running workflows and events using a stateless orchestrator, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to workflow engines, and more specifically to running workflows and events using a stateless orchestrator. While the present disclosure is not necessarily limited to such applications, various aspects of the disclosure may be appreciated through a discussion of various examples using this context.

Workflow engines may be used to control and oversee activities and processes of a workflow or event. A workflow may be a series of tasks to be executed in order to complete a job or process. An event, as referred to herein, may be an action or activity (e.g., keystroke, mouse click, button selection, any type of user selection, etc.) that corresponds to a specific process. The specific process may include a series of tasks to be executed, or completed. In some instances, workflow engines may have certain scaling capabilities, but scaling or usage across multi- or hybrid-cloud environments may be difficult due to complex integration requirements between the various environments. In addition, serverless functions may have scaling capabilities, but the events may be decentralized (i.e., no centralized control/authority) and it may not be possible to get information about the state of the events. This may lead to problems for various workflows, as it may be important to have a clear definition of the current state of a process (e.g., in a workflow or event).

Distributed workflows may be used to help determine a definition of the current state of a process, but conventional distributed workflows may be based on stateful services (i.e., services that require data to be stored and/or states to be saved) and defined orchestration. Because of the use of stateful orchestrators and management systems, full scaling capabilities of systems (e.g., on-premise system, cloud system, etc.) may not be available.

In addition, conventional workflow systems may use relational databases to attempt to determine states of a process, but relational databases may limit the scalability of the workflow engine, or system, due to the joins and locks design.

The present disclosure provides a computer-implemented method, system, and computer program product to run workflows and events using a stateless orchestrator. In some embodiments, the orchestrator manages all processes of the system. To ensure that the orchestrator may be stateless, the system may include various components including the orchestrator, a worker node, a provider, and a database. The worker node may execute the actual tasks defined in a process (e.g., as determined/defined from a workflow and/or an event). In some embodiments, the worker node executes a single task at a time. The provider, in some embodiments, manages the worker nodes. The provider may create nodes, remove nodes, and check the status of each node. In some embodiments, the orchestrator controls all the actions of the provider (e.g., through a defined interface). The database may store, or represent, information and depending states of the workflow engine. In some embodiments, the database is the single source of state for the workflow engine and is located externally from the orchestrator.

In some embodiments, a stateless orchestrator allows for full scalability and portability for distributed workflows. Because the orchestrator is stateless, the orchestrator may be able to handle, or manage, any event at any time. When multiple stateless orchestrators are utilized, services may be replaced on each stateless orchestrator in runtime.

In some embodiments, tokens are generated for each interaction between the orchestrator and the other components (e.g., the orchestrator and the worker node, the orchestrator and the provider, etc.). The tokens may be used to authenticate actions between the different components, or microservices. In some embodiments, the orchestrator removes, or deletes, the token once the task has been executed. In some embodiments, the process (e.g., from the workflow, event, etc.) defines how long the tokens are valid, such as a time approximate to the length of time required to execute the task, and the tokens stay valid until the length of time has passed. In some embodiments, the tokens are valid either until the task has been executed or the length of time has passed, whichever comes first.

Referring now to FIG. 1, a flowchart illustrating a method 100 for running workflows and events using a stateless orchestrator is depicted, according to some embodiments. In some embodiments, method 100 is executed by an orchestrator (e.g., orchestrator 210 (FIG. 2) and/or orchestrator 320 (FIG. 3)). In some embodiments, the method 100 is implemented as a computer script or computer program (e.g., computer executable code) to be executed by the orchestrator on or connected to a computer system (e.g., computer system 400 (FIG. 4)). In some embodiments, the orchestrator is a server. In some embodiments, the orchestrator is a computer device, such as computer system/server 402 (FIG. 4). In some embodiments, the orchestrator is a node (e.g., computing nodes 10 (FIG. 5)) within a cloud computing environment (e.g., cloud computing environment 50 (FIG. 5)).

In some embodiments, the orchestrator is configured to execute operation 110 to receive task data. As discussed herein, the orchestrator manages the processes (e.g., that correspond to a workflow and/or an event). Each process may be broken down into one or more tasks. Task data may be the information/data necessary for execution of a task (e.g., a first task from the one or more tasks). In some embodiments, the orchestrator requests the task data from a database (e.g., database 310 (FIG. 3)), and the database sends the task data to the orchestrator. Each request from the orchestrator may represent an action, and may require creation of a new token, for security purposes. The tokens, and the exchange of tokens between various components, is further discussed herein and depicted in FIG. 2.

In some embodiments, receiving the task data may include receiving an event, or indication that an event occurred. As discussed herein, the event may correspond to one or more processes (e.g., a defined process). The orchestrator, in response to receiving the event, may request the task data from the database. The task may correspond to, or be a part of, the defined process. For example, a user may have selected (e.g., via mouse click) a specific action (e.g., to pay a bill) on a user interface. The specific action may correspond to a process with multiple tasks that, when executed, complete the process. In this example, the completed process may be that the user's bill is paid. The process may be broken down into a plurality of tasks, and the orchestrator may request the data necessary to complete a first task, from the plurality of tasks, from the database. The database may transmit the requested data to the orchestrator.

In some embodiments, the orchestrator is configured to execute operation 120 to request a worker node. In some embodiments, the worker node will execute the specific task. To request a worker node, the orchestrator may transmit a request for a worker node to a provider. As discussed herein, the provider may create, monitor, and remove the nodes. Once the provider receives the request for a worker node, the provider may create the worker node. In some embodiments, creating the worker node includes creating a container (i.e., containerized application) and deploying/running the container on a dedicated machine (i.e., worker machine). The worker machine may have a local container provider and/or an external container provider.

In some embodiments, once the worker node has been created, the worker node will send a request to the orchestrator for the task data. The initial worker node (i.e., newly created worker node) may not have any task data, or process instance information, stored on the node. In order to execute the task, the worker node needs the necessary data, so the worker node may request the task data from the orchestrator.

In some embodiments, the orchestrator is configured to execute operation 130 to receive a request for the task data. As discussed herein, the request for the task data may be from the worker node. In some embodiments, the orchestrator is configured to execute operation 140 to transmit the task data to the worker node. Once the worker node requests the task data, the orchestrator may transmit, or send, the task data to the worker node. As discussed herein, the task data may be the data necessary to execute the task. Unnecessary data may remain on the database. Once the worker node receives the task data, the worker node may execute the task.

In some embodiments, the orchestrator is configured to execute operation 150 to receive results of the execution of the task. After the worker node executes the task, the worker node may transmit, or send, the results of the execution to the orchestrator. By sending the results to the orchestrator, the worker node may not store any task data or results data on the worker node, which may allow for the worker node to remain stateless. The orchestrator, in some embodiments, receives the results of the execution from the worker node. To keep the database as the only source of state for the workflow engine, the worker, or worker node, may work on a single task (e.g., for a single process instance or a shared process instance) and may not have any process instance information. The worker may only have access to data that is necessary to execute the single task, and the data may be removed from the worker once the task has been executed. In some embodiments, the worker is a plain execution environment for the actual task (e.g., sent by the orchestrator). In some embodiments, the worker is a dedicated sandbox.

In some embodiments, the orchestrator is configured to execute operation 160 to transmit the results to a database.

In order for the orchestrator to also remain stateless, the orchestrator may transmit, or send, the results of the execution to the database. By sending the results to the database, the database may store the results, thus remaining stateful. The orchestrator may not store any results or task data; therefore the orchestrator may remain stateless.

In some embodiments, method 100 further includes operation 170 to transmit a request to remove the worker node. Once the worker node has executed the task, the worker node may no longer be needed. Therefore, after the orchestrator receives the results of the execution (indicating that the task has been executed), the orchestrator may transmit/send a request to remove the worker node to the provider. The provider may then remove the worker node. In some embodiments, removing the worker node includes removing the created container from the dedicated machine. Once the worker node is removed, the worker nodes have free capacity to run other tasks, if needed (e.g., tasks from another orchestrator).

In some embodiments, the orchestrator is configured to execute operation 180 to receive task data for a second task. As discussed herein, a process may correspond to a series of tasks. In some embodiments, the orchestrator may be managing a process with multiple tasks. Once a first task is completed, the orchestrator may start a second task. In some embodiments, the orchestrator may be managing multiple processes, and the second task may correspond to a second process. The orchestrator may request task data for the second task from the database. In response to receiving the request, the database may transmit, or send, the task data, or the data necessary to execute the second task, to the orchestrator.

In some embodiments, the orchestrator is configured to execute operation 190 to request a second worker node. In order to execute the second task, the orchestrator may transmit, or send, a request for a second worker node to the provider. The second worker node may be a worker node that executes the second task. In response to receiving the request, the provider may create the second worker node. Similar to operations 130-160 of method 100, the orchestrator may then receive a request for the task data for the second task from the second worker node, transmit the task data to the second worker node, receive the results of the execution of the second task, and transmit the results of the second task to the database. In addition, similar to operation 170, the orchestrator may transmit a request to remove the second worker node. This process may repeat for any number of tasks that are being managed by the orchestrator.

In some embodiments, method 100 may be executed on a non-structured query language (NoSQL) database. NoSQL databases may scale across multiple nodes. In some embodiments, when enough network and physical resources are available, each component (e.g., orchestrator, provider, and worker) may scale and deploy independently, and automatically, on different nodes. The orchestrator, because it may have no state (as discussed herein), may be scaled, or redeployed, by adding multiple orchestrators. For example, when an orchestrator is managing multiple processes, additional orchestrators can be created (e.g., one for each process), therefore scaling the orchestrator. In some embodiments, the orchestrator may receive a plurality of events. Each event of the plurality of events may correspond to a defined process. To scale the orchestrator in order to manage the plurality of events, a plurality of orchestrators may be created. In some embodiments, the plurality of orchestrators manages the plurality of events. In some embodiments, each orchestrator, from the plurality of orchestrators, manages a corresponding event, from the plurality of events.

Additionally, if there are multiple tasks to be executed, the orchestrator may create multiple providers, either local or external, which in turn may create multiple worker nodes (e.g., multiple container instances on dedicated machines). In some embodiments, the orchestrator may instruct a single provider to create multiple worker nodes. In some embodiments, the database may also be scaled by, if the orchestrator(s) is deployed in a cloud environment, including external nodes in a database cluster.

Figure 2:
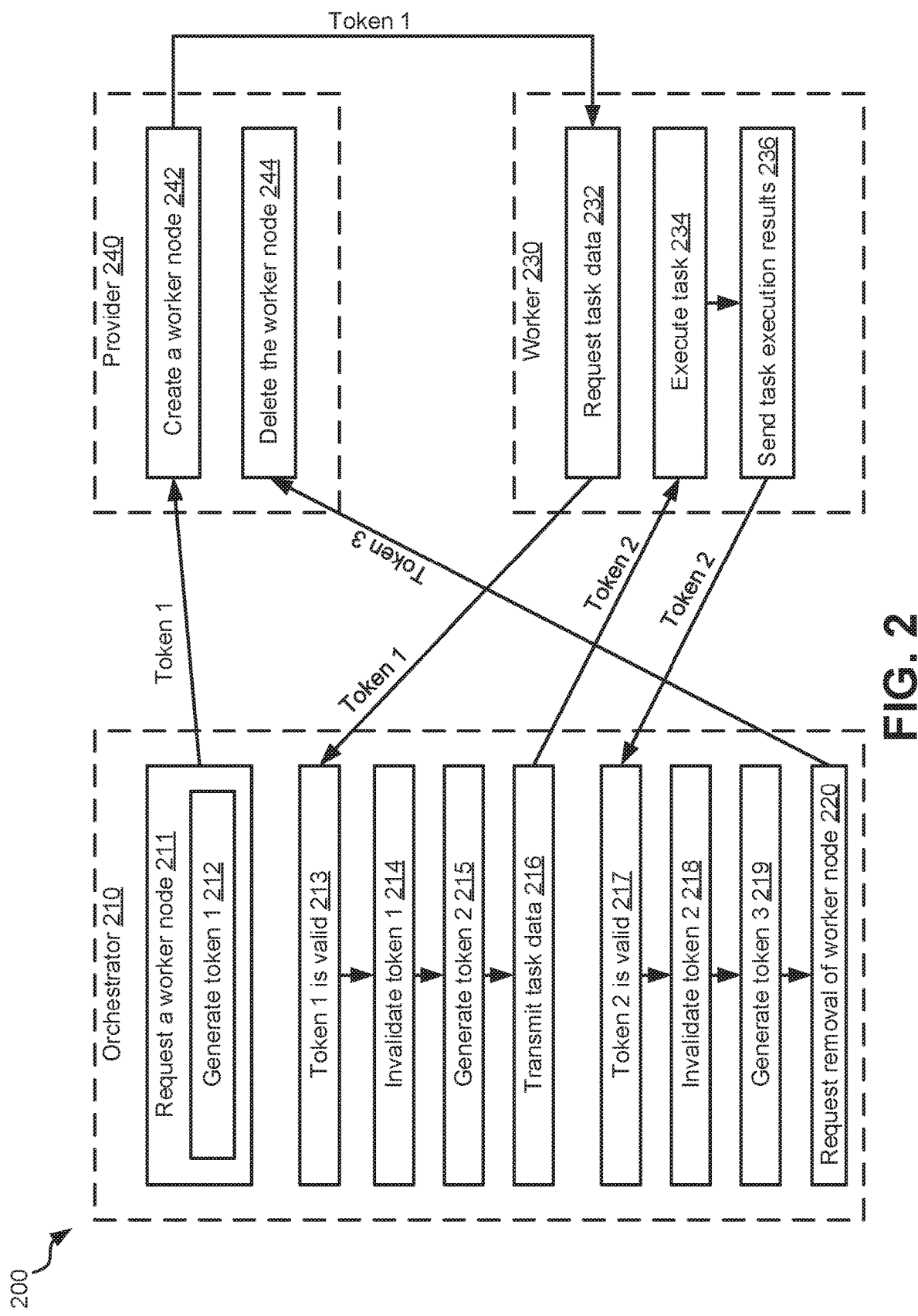
FIG. 2 depicts a schematic diagram of an example stateless orchestrator environment and the interactions between components, according to some embodiments.

Referring to FIG. 2, a schematic diagram or an example stateless orchestrator environment 200 and the interactions between components is depicted, according to some embodiments. Stateless orchestrator environment 200 may include an orchestrator 210, provider 240, and worker 230. In some embodiments, orchestrator 210 executes method 100 (FIG. 1). As discussed herein, orchestrator 210 interacts with provider 240 and worker 230 in order to maintain a stateless orchestrator 210. Further, to ensure security/authentication, interactions between the orchestrator and various other components may use generated tokens.

In some embodiments, orchestrator 210 may execute operation 211 to request a worker node. Operation 211 may correspond to operation 110 of requesting a first node (FIG. 1). In some embodiments, requesting a worker node (211), or transmitting the request for the worker node to the provider, may include generating the first token (212). Because the orchestrator will be interacting with the provider 240 and then with the worker node 230, a first token may be generated in order to maintain data security and authentication. In some embodiments, when requesting a worker node (211), or transmitting the request for the worker node to the provider, the first token may also be transmitted to the provider.

In some embodiments, in response to receiving the request for a worker node 211 along with the first token (i.e., token 1), the provider 240 may execute operation 242 to create a worker node. When provider 240 creates the worker node 230 (242), the provider 240 may inject the first token into the worker node 230. Injecting the first token into the worker node 230 may provide the first token to the worker node 230, therefore allowing the worker node 230 to have the proper authentication for the necessary data. In some embodiments, the provider 240 creates the worker node 230 (operation 242) by reusing an existing worker node and executing a current process instance, that corresponds to the task, on the existing worker node. For example, the provider 240 may notify the orchestrator 210 of an existing worker node, and the orchestrator may transmit the task data (e.g., operation 216) to the existing worker node. Utilizing an existing worker node may increase efficiency (e.g., save time and speed up processing) because the provider 240 may not need to create a new worker node. In some embodiments, the requirements of the system(s) may determine whether reusing an existing worker node is allowed.

In some embodiments, worker 230 may execute operation 232 of requesting task data from the orchestrator 210. When requesting the task data (232), the orchestrator may transmit, or send, the first token along with the request. In some embodiments, when the orchestrator 210 receives the request from the worker node for the task data (e.g., operation 130 of FIG. 1), the orchestrator 210 further receives the first token (e.g., token 1) from the worker node 230.

In some embodiments, in response to receiving the request for task data from the worker node 230, the orchestrator 210 may determine whether the first token is a valid token in operation 213. The token data may be stored in the database, therefore maintaining a stateless orchestrator 210. In some embodiments, the tokens are only valid as long as defined in the process, therefore determining whether the first token is a valid token may include identifying a defined time from the process. In some embodiments, the orchestrator may monitor, or track, which tokens have not been removed. Therefore, determining whether the first token is a valid token may include determining whether the first token has been removed (e.g., the original was removed, but a duplicate was created—the duplicate being invalid). In some embodiments, orchestrator may determine that the first token, or token 1, is a valid token. Because the first token is a valid token, the worker node 230 may have the proper authentication for the task data. Therefore, the transmitting the task data (operation 216) may be in response to determining that the first token is a valid token.

In some embodiments, once the first token has been validated, the first token may be removed, or invalidated, in operation 214. In some embodiments, the first token is automatically removed, or invalidated, once the time, as defined in the process, has passed (i.e., after a first time period, the first time period defined in the process). In some embodiments, orchestrator 210 may invalidate the first token once it has been used. Invalidating the token may cause it to be removed from the database so that another orchestrator may not recreate, or duplicate, the same task.

In some embodiments, a second token may be generated (operation 215). Because the orchestrator 210 may be interacting with the worker, therefore performing another action, the orchestrator may create a new token for the action. In some embodiments, when the orchestrator 210 transmits the task data (operation 216) to the worker node 230, the transmitting the task data may include transmitting the second token to the worker node. The worker node 230, may then execute operation 234 to execute the task. Once the worker node 230 has executed the task (234), the worker node 230 may send, or transmit, the task execution results to the orchestrator 210 in operation 236. In some embodiments, the worker node 230 may send the second token along with the task execution results. Therefore, the orchestrator 210 receiving the results of the execution of the task (e.g., operation 150 of FIG. 1) may further include receiving the second token from the worker node 230.

In some embodiments, the orchestrator 210, after receiving the second token from the worker node, may determine whether the second token is valid, in operation 217. If the second token is not valid, the task execution results may be invalid (e.g., duplicate results, results from an incorrect worker node, etc.) and therefore may not be transmitted to the database. If the second token is valid, the orchestrator 210 may transmit the execution results to the database.

In some embodiments, once the second token has been validated, the second token may be removed, or invalidated, in operation 218, to remove the second token from the database so that the token is not used by another orchestrator. In some embodiments, the second token is automatically removed, or invalidated, once the time, as defined in the process, has passed (i.e., after a second time period, the second time period defined in the process). In some embodiments, orchestrator 210 may invalidate the second token once it has been used.

In some embodiments, as discussed herein, the orchestrator 210 may request that the worker node be removed (e.g., operation 170 of FIG. 1) once it is no longer needed (e.g., after the execution results have been received by the orchestrator 210). In some embodiments, the interaction between the orchestrator 210 and the provider 240 in order to remove the worker node may warrant another token. Therefore, in some embodiments, the orchestrator 210 may execute operation 219 to generate a third token, or token 3. In some embodiments, when the orchestrator requests removal of the worker node in operation 220, the orchestrator may further transmit the third token to the provider 240. Once the provider 240 receives the request for removal, in some instances the request including the third token, the provider 240 may execute operation 244 to delete the worker node.

In some embodiments, tokens are only generated for interactions, or actions, between the orchestrator 210 and the worker 230. These actions may be direct or indirect (e.g., through the provider 240). In some embodiments, tokens are generated for all orchestrator 210 interactions with other components.

In some embodiments, the interactions between the orchestrator 210, provider 240, and worker 230 may repeat for additional tasks and/or processes. For example, once the first task is executed, the orchestrator 210 may have an additional task(s) for execution, and the orchestrator may repeat the operations (e.g., starting with operation 211) for the new task.

Figure 3:
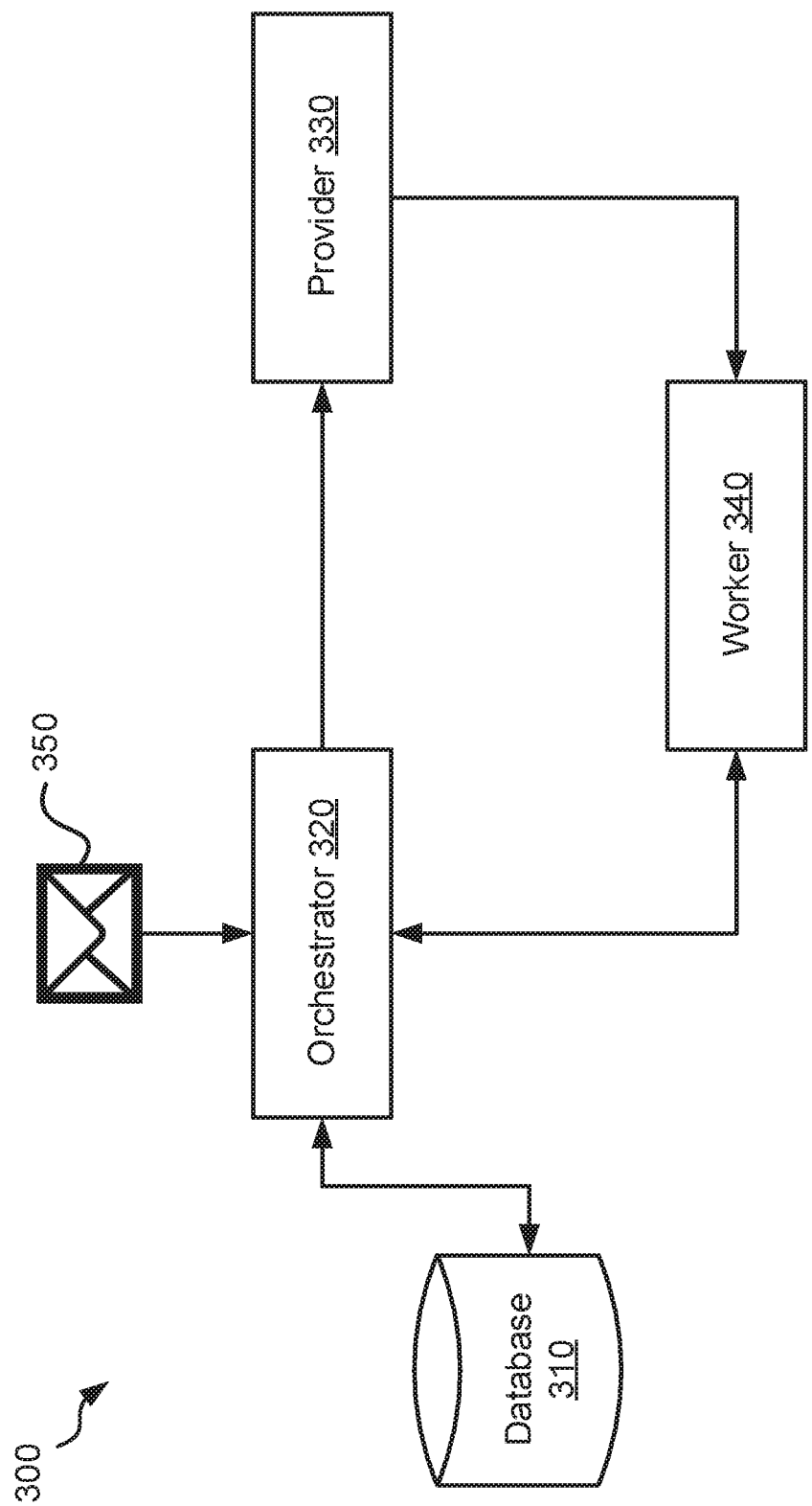
FIG. 3 depicts a block diagram of components of a system for running workflows and events using a stateless orchestrator, according to some embodiments.
Figure 4:
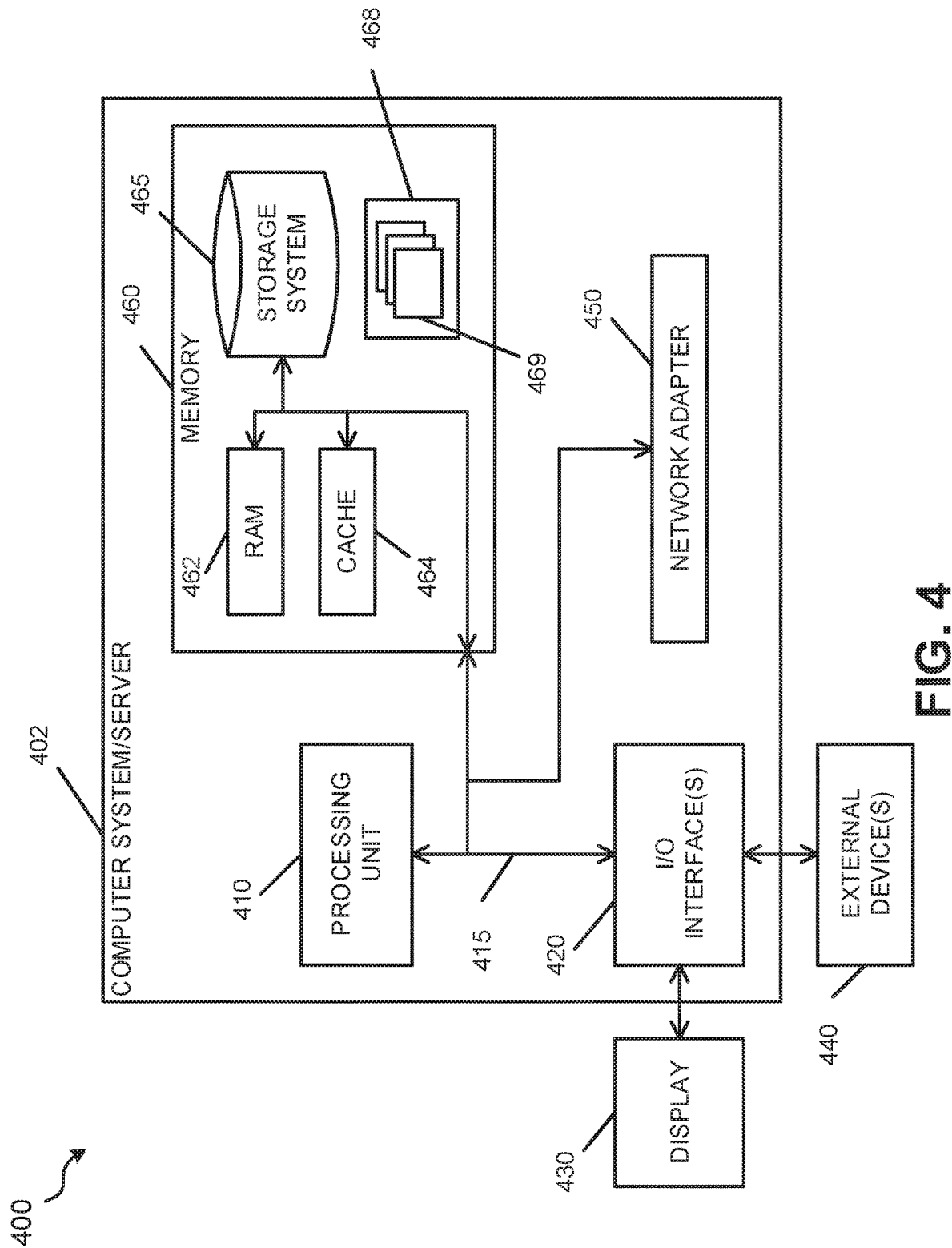
FIG. 4 depicts a block diagram of a sample computer system, according to some embodiments.

Referring to FIG. 3, a block diagram of components of an example system 300 for using a stateless orchestrator is depicted, according to some embodiments. The system 300 may include a database 310, an orchestrator 320, a provider 330, and a worker 340. In some embodiments, orchestrator 320 corresponds to orchestrator 210, provider 330 corresponds to provider 240, and worker 340 corresponds to worker 230 from FIG. 2. In some embodiments, orchestrator 320 performs the method 100 from FIG. 1.

In some embodiments, orchestrator 320 may receive an event (or a workflow) 350. In response to receiving the event, the orchestrator may request and receive the task data (for a task corresponding to the event) from the database 310. The orchestrator 320 may send a request to the provider 330 for a new worker node. The provider, in response to receiving the request from the orchestrator 320, may create and start a new worker node 340. In some embodiments, the worker node 340 requests task data from the orchestrator in order to execute the task. The orchestrator may send the task data to the worker node 340. In some embodiments, once the task has been executed, the worker node 340 may transmit the results of the execution to the orchestrator 320. The orchestrator 320 may then transmit the results of the execution to the database 310, in order to maintain a stateless orchestrator 320.

Referring to FIG. 4, computer system 400 is a computer system/server 402 is shown in the form of a general-purpose computing device, according to some embodiments. In some embodiments, computer system/server 402 is located on the linking device. In some embodiments, computer system 402 is connected to the linking device. The components of computer system/server 402 may include, but are not limited to, one or more processors or processing units 410, a system memory 460, and a bus 415 that couples various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random-access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the disclosure.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
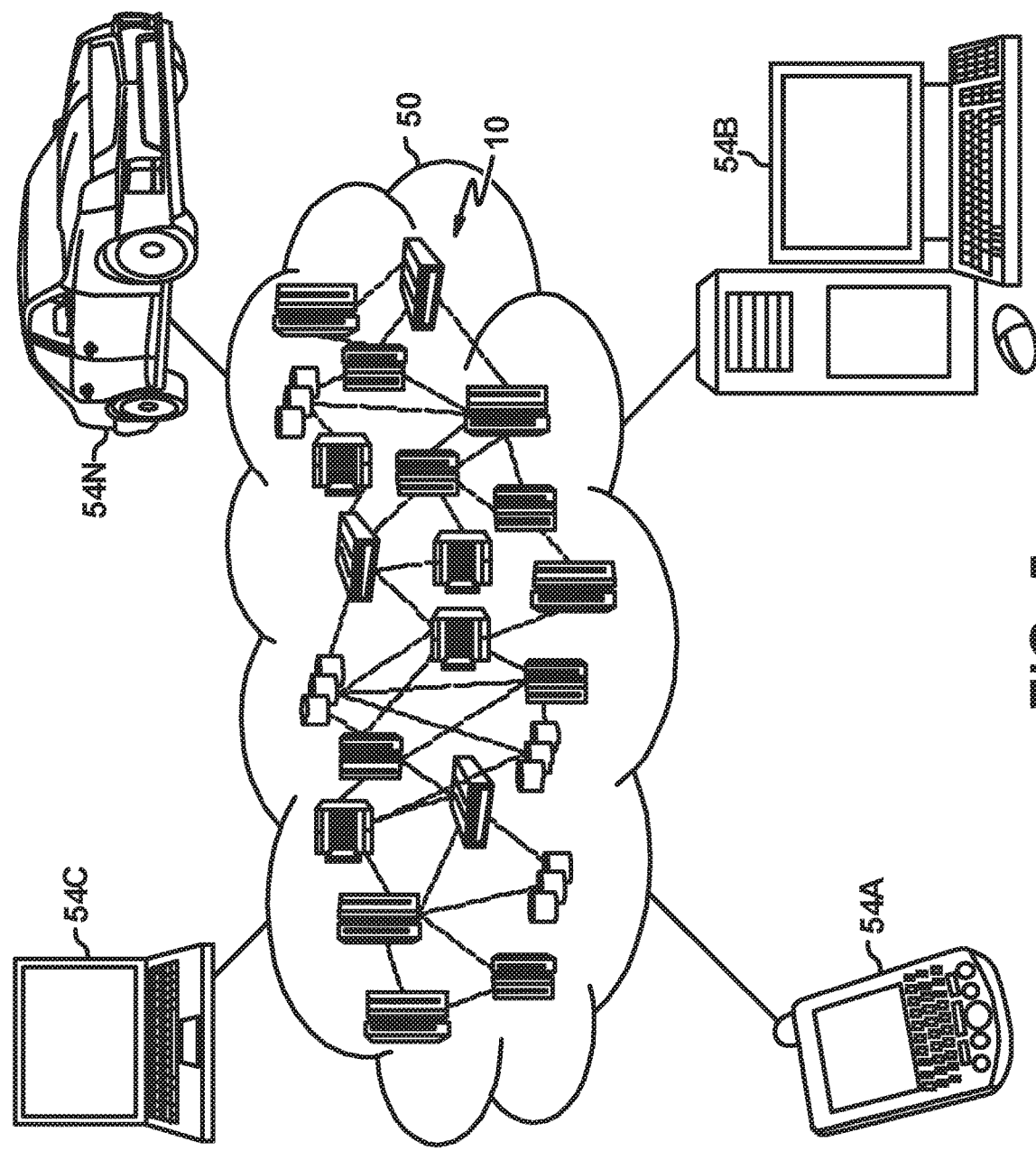
FIG. 5 depicts a cloud computing environment, according to some embodiments.

Referring now to FIG. 5, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
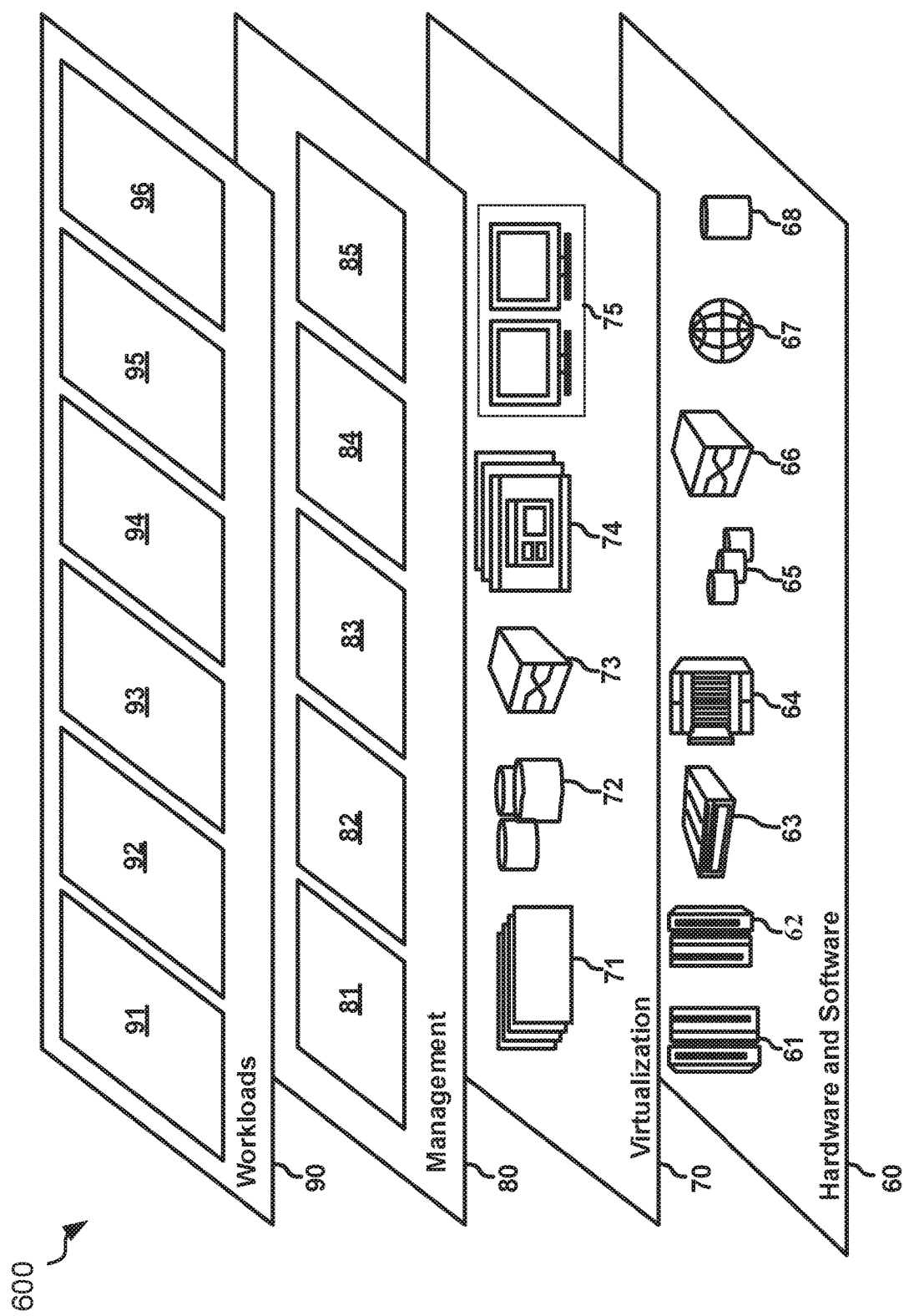
FIG. 6 depicts abstraction model layers, according to some embodiments.

Referring now to FIG. 6, a set of functional abstraction layers 600 provided by cloud computing environment 50 (FIG. 5) is shown, according to some embodiments. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event and workflow processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving first task data for a first task, wherein the first task data is information necessary for execution of the first task;
generating a first token;
transmitting a request for a worker node and the first token to a provider, wherein the provider creates the worker node;
receiving a request for the first task data and the first token from the worker node;
in response to receiving the request, determining whether the first token is a valid token;
in response to determining that the first token is a valid token, invalidating the first token;
generating a second token;
transmitting the first task data and the second token to the worker node, wherein the worker node executes the first task;
receiving results of the execution of the first task from the worker node; and
in response to the receiving the results, transmitting the results to a database.

2. The method of claim 1, further comprising:
in response to the receiving the results, transmitting a request to remove the worker node to the provider.

3. The method of claim 2, further comprising:
receiving second task data for a second task, wherein the second task data is information necessary for execution of the second task; and
transmitting a request for a second worker node to the provider.

4. The method of claim 1, wherein:
the provider injects the first token into the worker node.

5. The method of claim 4, further comprising:
wherein the transmitting the first task data is in response to determining that the first token is a valid token.

6. The method of claim 1, wherein the receiving the results of the execution of the first task further includes receiving the second token from the worker node.

7. The method of claim 1, wherein receiving the first task data comprises:
   receiving an event, wherein the event corresponds to a defined process; and
   in response to receiving the event, requesting the first task data from the database, wherein the first task is a part of the defined process.

8. The method of claim 1, further comprising:
   receiving a plurality of events, wherein each event of the plurality of events corresponds to a defined process; and
   creating a plurality of orchestrators, wherein the plurality of orchestrators manage the plurality of events.

9. A system having one or more computer processors, the system configured to:
   receive first task data for a first task, wherein the first task data is information necessary for execution of the first task;
   transmit a request for a worker node and a first token to a provider, wherein the provider creates the worker node;
   receive a request for the first task data and the first token from the worker node;
   in response to receiving the request, determine whether the first token is a valid token;
   invalidate the first token;
   in response to determining that the first token is a valid token, transmit the first task data and a second token to the worker node, wherein the worker node executes the first task;
   receive results of the execution of the first task from the worker node; and
   in response to the receiving the results, transmit the results to a database.

10. The system of claim 9, further configured to:
    in response to the receiving the results, transmit a request to remove the worker node to the provider.

11. The system of claim 10, further configured to:
    receive second task data for a second task, wherein the second task data is information necessary for execution of the second task; and
    transmit a request for a second worker node to the provider.

12. The system of claim 9, wherein transmitting the request for the worker node to the provider comprises
    generating the first token; and
    wherein the provider injects the first token into the worker node.

13. The system of claim 9, wherein receiving the first task data comprises:
    receiving an event, wherein the event corresponds to a defined process; and
    in response to receiving the event, requesting the first task data from the database, wherein the first task is a part of the defined process.

14. The system of claim 9, wherein the first token is invalidated after a first time period.

15. The system of claim 9, wherein the first token is invalidated in response to determining that the first token is a valid token.

16. The system of claim 9, wherein:
    the receiving the results of the execution of the first task from the worker node further comprises receiving the second token from the worker node; and
    the transmitting the results to a database is in response to determining that the second token is valid, and further includes invalidating the second token.

17. A computer program product comprising a computer readable storage medium having program instructions embodied therewith, the program instructions executable by a server to cause the server to perform a method, the method comprising:
    receiving first task data for a first task, wherein the first task data is information necessary for execution of the first task;
    transmitting a request for a worker node and a first token to a provider, wherein the provider creates the worker node;
    receiving a request for the first task data and the first token from the worker node;
    in response to receiving the request, determining whether the first token is a valid token;
    invalidating the first token;
    in response to determining that the first token is a valid token, transmitting the first task data and a second token to the worker node, wherein the worker node executes the first task;
    receiving results of the execution of the first task from the worker node; and
    in response to the receiving the results, transmitting the results to a database.

18. The computer program product of claim 17, further comprising:
    in response to the receiving the results, transmitting a request to remove the worker node to the provider;
    receiving second task data for a second task, wherein the second task data is information necessary for execution of the second task; and
    transmitting a request for a second worker node to the provider.

19. The computer program product of claim 17, wherein transmitting the request for the worker node to the provider comprises
    the first token; and
    wherein the provider injects the first token into the worker node.

20. The computer program product of claim 17, wherein receiving the first task data comprises:
    receiving an event, wherein the event corresponds to a defined process; and
    in response to receiving the event, requesting the first task data from the database, wherein the first task is a part of the defined process.

\* \* \* \* \*